United States Patent
Zhou et al.

(10) Patent No.: US 8,515,911 B1
(45) Date of Patent: Aug. 20, 2013

(54) METHODS AND APPARATUS FOR MANAGING MULTIPLE POINT IN TIME COPIES IN A FILE SYSTEM

(75) Inventors: Siyu Zhou, Millis, MA (US); Hongliang Tang, Shrewsbury, MA (US); Xiangping Chen, Shrewsbury, MA (US); Sairam Iyer, South Grafton, MA (US); Mark Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 596 days.

(21) Appl. No.: 12/349,182

(22) Filed: Jan. 6, 2009

(51) Int. Cl.
*G06F 7/00* (2006.01)
*G06F 17/30* (2006.01)

(52) U.S. Cl.
USPC .......................... 707/638; 707/649; 707/800

(58) Field of Classification Search
USPC .......................... 707/638, 649, 800
See application file for complete search history.

(56) References Cited

U.S. PATENT DOCUMENTS

| | | | |
|---|---|---|---|
| 5,504,879 A * | 4/1996 | Eisenberg et al. .................... 1/1 |
| 5,758,347 A * | 5/1998 | Lo et al. ................................ 1/1 |
| 6,434,681 B1 | 8/2002 | Armangau |
| 6,792,518 B2 | 9/2004 | Armangau et al. |
| 6,934,822 B2 | 8/2005 | Armangau et al. |
| 6,957,362 B2 | 10/2005 | Armangau |
| 7,035,881 B2 | 4/2006 | Tummala et al. |
| 7,284,016 B2 | 10/2007 | Venkatesh et al. |
| 7,296,125 B2 | 11/2007 | Ohran |
| 7,308,448 B1 * | 12/2007 | Martin .................................. 1/1 |
| 7,523,278 B2 | 4/2009 | Thompson et al. |
| 7,546,431 B2 | 6/2009 | Stacey et al. |
| 7,549,028 B2 | 6/2009 | Thompson et al. |
| 7,555,504 B2 | 6/2009 | Bixby et al. |
| 7,567,991 B2 | 7/2009 | Armangau et al. |
| 7,676,514 B2 | 3/2010 | Faibish et al. |
| 7,716,171 B2 | 5/2010 | Kryger |
| 7,716,185 B2 | 5/2010 | Thompson et al. |
| 7,716,435 B1 | 5/2010 | Allen |
| 2003/0018652 A1 * | 1/2003 | Heckerman et al. ........ 707/104.1 |
| 2005/0065986 A1 * | 3/2005 | Bixby et al. ................... 707/204 |
| 2006/0143412 A1 | 6/2006 | Armangau |
| 2006/0212481 A1 * | 9/2006 | Stacey et al. ............... 707/104.1 |
| 2008/0059541 A1 * | 3/2008 | Fachan et al. ................ 707/204 |
| 2008/0080539 A1 * | 4/2008 | Hong et al. .................. 370/402 |
| 2008/0114951 A1 * | 5/2008 | Lee ............................... 711/162 |
| 2009/0106238 A1 * | 4/2009 | Lita et al. .......................... 707/5 |

* cited by examiner

*Primary Examiner* — James E Richardson
(74) *Attorney, Agent, or Firm* — Muirhead and Saturnelli, LLC

(57) ABSTRACT

Methods and apparatus for organizing a plurality of versions of a file in a file system. The plurality of versions of the file are stored in a data structure having a hierarchical organization that reflects relationships among the plurality of versions. Each version of the plurality of versions is assigned a name that identifies its position in the hierarchical organization. The hierarchical organization of the data structure and the descriptive naming convention used for the plurality of versions in the data structure facilitates deleting a version while retaining other versions derived from the version following the deletion of the version, and enables a staged initialization of the data structure upon system start-up.

19 Claims, 14 Drawing Sheets

METHODS AND APPARATUS FOR MANAGING MULTIPLE POINT IN TIME COPIES IN A FILE SYSTEM

TECHNICAL FIELD

The present invention relates to techniques for managing multiple point in time copies of files in a file system.

BACKGROUND

A file is a logical unit of data in a file system. As referred to herein, a snapshot of a file is a read-only copy of a file as it existed at a certain point in time. That is, at a given point in time, a snapshot may be created of a file (hereinafter referred to as a production file) in a file system (or of the entire file system) that is being read from and written to by one or more applications. The content of the snapshot reflects the content of the production file at the given point in time. If the production file is modified after the snapshot is created, the content of the snapshot remains the same, even though the content of the production file has changed. The snapshot may be used in any desired way. For example, if the production file becomes corrupted or is modified in an undesirable way, the snapshot may be used to restore the production file to its state at the time that the snapshot was created, although other uses are possible.

FIG. 1A is a block diagram of an example of a snapshot of a file. The snapshot 100 comprises metadata 110 and file data 120, which may include one or more data blocks. In a typical file system incorporating snapshots, metadata 110 is a copy of a conventional mode for a file in the file system. Such a conventional mode is shown in FIG. 1B. An mode is a data structure for a file that is used to store information about the file (i.e., metadata). Typically, a file system includes an mode for each file in the file system. FIG. 1B illustrates some of the information stored about a file in a conventional mode 110. Inode 110 includes a mode field 181, an access time field 182, a change time field 183, one or more data block pointers 184, and one or more indirect block pointers 185. The mode field 181 specifies the access permissions for the file (e.g., which users can read, write, and/or execute the file), the access time field 182 is used to store the last time the file was accessed, the change time field 183 is used to store the last time that the file was modified, and the data block pointer(s) 184 and indirect block pointer(s) 185 are used to specify the storage locations at which the file data 120 is stored on a storage medium, such as a physical disk or logical volume of storage. As used herein, data block pointers 184 refer to pointers to blocks on disk, in a logical volume, or other storage medium that store file data, and indirect block pointers 185 refer to pointers to blocks on disk, in a logical volume, or other storage medium that store either data block pointers or other indirect block pointers.

One way to create a snapshot of a file is to create a copy of the mode for the file to form the mode for the snapshot, create a copy of each data block and indirect block referenced by the file, and modify the data block pointers and indirect block pointers in the snapshot copy of the mode to point to the newly created copies of the data blocks and indirect blocks. In one example shown in FIG. 2, production mode 201 points to two data blocks (i.e., data block 203 and data block 205). To create a snapshot of the file corresponding to mode 201, a copy 207 of production mode 201 may be created, copies 209 and 211 of data blocks 203 and 205 may be created, and the pointers in mode 207 may be modified to point to data blocks 209 and 211 instead of data blocks 203 and 205 (as in the mode for the production file).

In another approach to creating a snapshot of a file (referred to as "write-anywhere"), a copy of the production file mode is created at the time of snapshot creation, but data blocks and/or indirect blocks are copied only if and when the corresponding blocks in the production file are modified. In an example shown in FIG. 3A, production mode 301 includes pointers to data block 303 and data block 305. When a snapshot is created, a copy of production mode 301 is stored as snapshot mode 307, but it points to the same data blocks 303 and 305. When one or more data blocks in the production file are modified, new data blocks are allocated to store the modified data and the corresponding pointer(s) in production mode 301 are updated to point to the new data block(s). For example, as shown in FIG. 3B, if a write occurs that would result in data block 303 being modified, a new data block 309 is allocated to store the modified data and the pointer to data block 303 in production mode 301 is updated to point to data block 309. In contrast, snapshot mode 307 is not updated and continues to point to the data blocks of the production file at the time of the snapshot creation (i.e., data blocks 303 and 305).

SUMMARY

One illustrative embodiment of the invention is directed to a method of organizing a plurality of versions of a file, wherein the plurality of versions of the file comprise a production version, one or more snapshot versions, and one or more branch versions, wherein a snapshot version is a read-only copy of the production version of one of the one or more branch versions, and wherein a branch version is a modifiable copy of one of the one or more snapshot versions. The method comprises an act of: (A) storing the plurality of versions of the file in a data structure having a hierarchical organization that reflects relationships among the plurality of versions, and wherein each version of the plurality of versions is assigned a name that identifies its position in the hierarchical organization.

Another illustrative embodiment of the invention is directed to at least one computer-readable storage medium encoded with a series of instructions that, when executed by a computer, perform a method of organizing a plurality of versions of a file, wherein the plurality of versions of the file comprise a production version, one or more snapshot versions, and one or more branch versions, wherein a snapshot version is a read-only copy of the production version of one of the one or more branch versions, and wherein a branch version is a modifiable copy of one of the one or more snapshot versions. The method comprises an act of: (A) storing the plurality of versions of the file in a data structure having a hierarchical organization that reflects relationships among the plurality of versions, and wherein each version of the plurality of versions is assigned a name that identifies its position in the hierarchical organization.

A further illustrative embodiment of the invention is directed to a computer system for organizing a plurality of versions of a file, wherein the plurality of versions of the file comprise a production version, one or more snapshot versions, and one or more branch versions, wherein a snapshot version is a read-only copy of the production version of one of the one or more branch versions, and wherein a branch version is a modifiable copy of one of the one or more snapshot versions. The computer system comprises at least one storage medium for storing the plurality of versions of the file and at least one processor programmed to store, on the at least one storage medium, the plurality of versions of the file in a data structure having a hierarchical organization that reflects relationships among the plurality of versions, and wherein each version of the plurality of versions is assigned a name that identifies its position in the hierarchical organization.

BRIEF DESCRIPTION OF THE DRAWINGS

Aspects of the invention are described with reference to illustrative embodiments and the following drawings in which like reference characters represent like elements, and wherein.

DETAILED DESCRIPTION

Figure 1A:
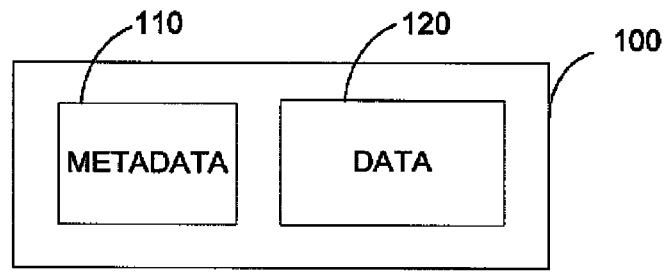
FIGS. 1A and 1B are respective block diagrams of a prior art snapshot and a conventional inode for a file.
Figure 1B:
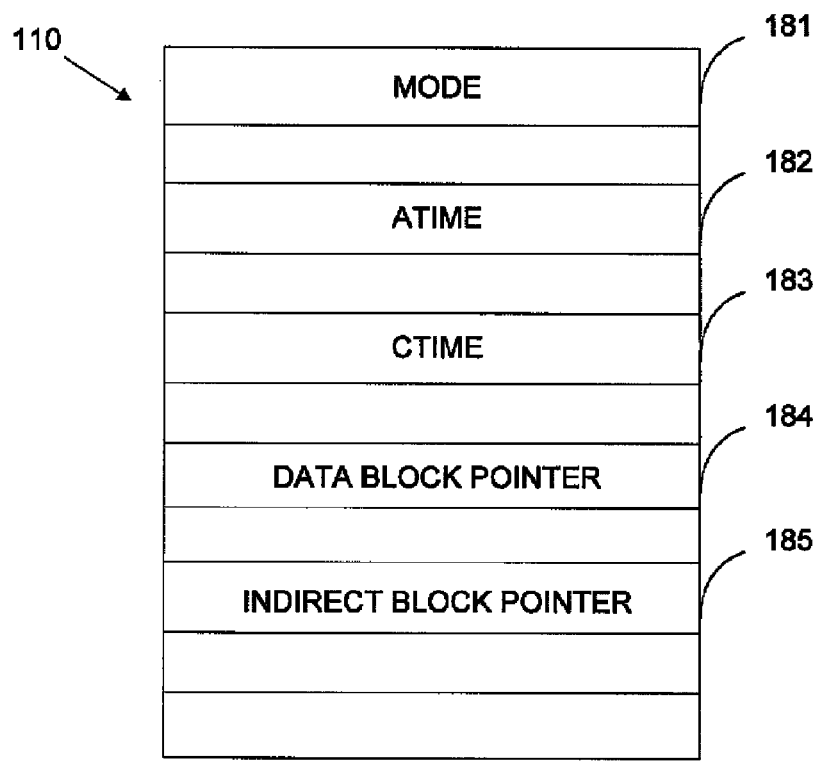
Figure 2:
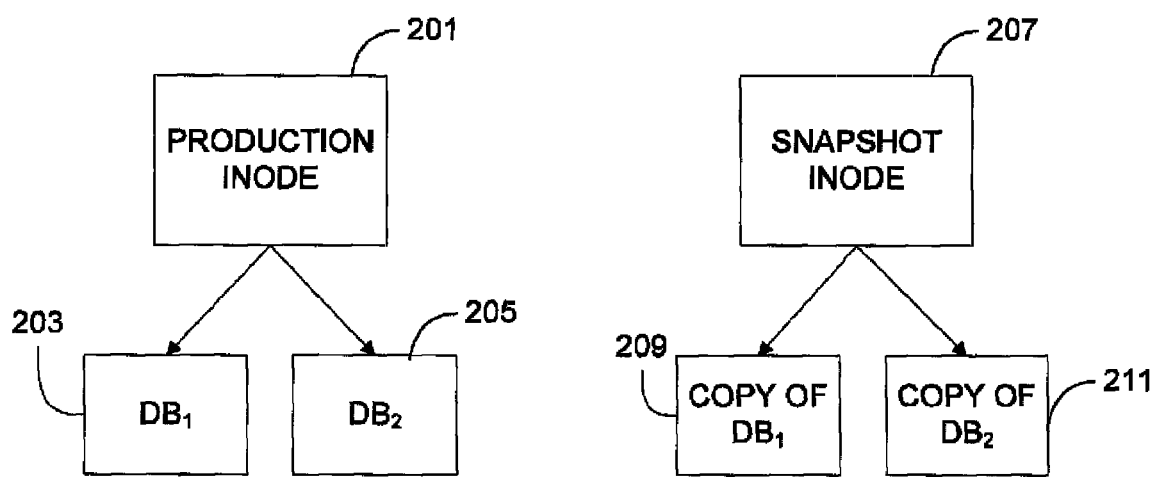
FIG. 2 is a block diagram of a prior art technique for creating a snapshot copy of a file.
Figure 3A:
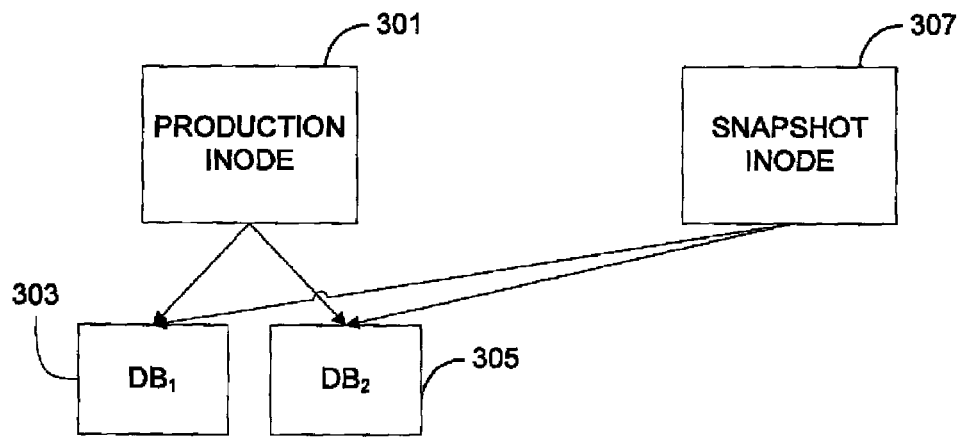
FIGS. 3A and 3B are block diagrams of a prior art technique for creating a snapshot of a file.
Figure 3B:
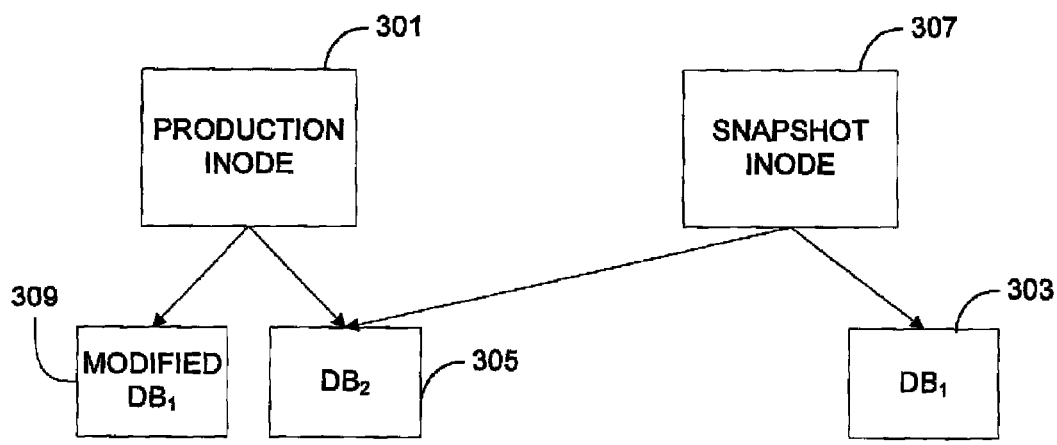
Figure 4A:
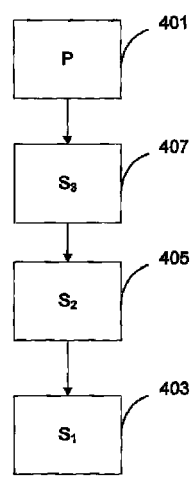
FIGS. 4A and 4B are respective block diagrams of a production file and a set of snapshots having a linear version chain and an in-memory representation of the linear version chain.

One conventional technique for associating a plurality of snapshots with a production file is to keep track of the relationships between the snapshots and the production file using a linked list. FIG. 4A shows a production file 401 from which three snapshots were created at different points in time. Each of these snapshots can be considered an earlier version of the production file. Thus, snapshot 403 may be considered the first (or earliest preserved) version of the production file, snapshot 405 may be considered the second version of the production file, and snapshot 407 may be considered the third version of the production file. When the version chain is linear, as shown in FIG. 4A, the relationship between the different snapshots is clear, as each snapshot version in the chain "inherits" any data blocks reflected as modified in subsequently created snapshots. The relationship between subsequently created snapshots may be stored in a version chain data structure 410 (FIG. 4B), which may be updated every time that a new snapshot is created.

Applicants have appreciated that managing the relationships between snapshots becomes much more complex when the version chain is not linear. A non-linear version chain may result when additional snapshots of a previously-created snapshot (called "snapshots of snapshots") are created, as described in more detail below. In some embodiments, snapshots of snapshots may be created from a read/write copy of a snapshot called a branch version. Since snapshots are read-only copies of a production file, branch versions of snapshots are created when an application, or other entity, wants to modify the contents of a snapshot without destroying the original contents of the snapshot. In one implementation, a branch version may be "promoted" to allow one or more applications to read and write to the branch version. During promotion, a branch version may be mapped to an active storage resource (e.g., a logical unit number (LUN) on a server other than the server that is hosting the production file of the version set to which the branch version's snapshot belongs), to enable one or more applications to make modifications to the branch version or create one or more snapshots of the branch version to establish point-in-time copies of the branch version. By creating one or more snapshots of the branch version, a history of the changes made to the branch version by the one or more applications during its promotion may be stored and/or used, for example, to restore a production file to a particular point in time at which one of the snapshots of snapshots was created.

In some implementations, when an application is done using a branch version it is "demoted" to unlink the branch version from any active storage resources (e.g., a LUN) thereby preventing access to it. In some prior art systems, snapshots of a branch version created during promotion of the branch version were not retained following demotion of the branch version, resulting in the loss of all modifications to the branch version during its promotion. By contrast, in some embodiments disclosed herein, snapshots of a branch version created during promotion may be retained following demotion of the branch file to store a history of all changes to the production file. In accordance with some embodiments of the invention, the retained snapshots of a branch version (i.e., snapshots of snapshots) may be linked to their parent snapshot (i.e., the snapshot from which the branch version was created) in the version chain, and the snapshots of snapshots may themselves be promoted (e.g., mapped to an active storage resource such as a LUN), modified (e.g., by creating a branch version), and have additional "child" snapshots created (e.g., after creation and promotion of a branch version).

Figure 4B:
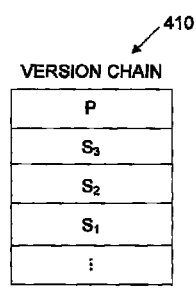

The ability to create and store snapshots of snapshots of a production file is referred to herein as full branching. In full branching, as additional snapshots of snapshots are created, it should be appreciated that keeping track of the relationships between the snapshot versions in a linked list data structure (e.g., version chain 410) becomes more complex. For example, some snapshots in the version set may be both a child snapshot (e.g., a snapshot of the production file) and a parent snapshot (e.g., a snapshot may have child snapshots of its own that were created during promotion of a branch version). Accordingly, as the number of snapshots in a version set becomes large, the relationship between the snapshots in the version set begins to resemble a mesh more than the linear sequence of snapshots illustrated in FIG. 4A. Applicants have appreciated that managing the relationships between the snapshots in a version set mesh using a linked list data structure as shown in FIG. 4B becomes exceedingly difficult as the mesh become large.

Figure 5A:
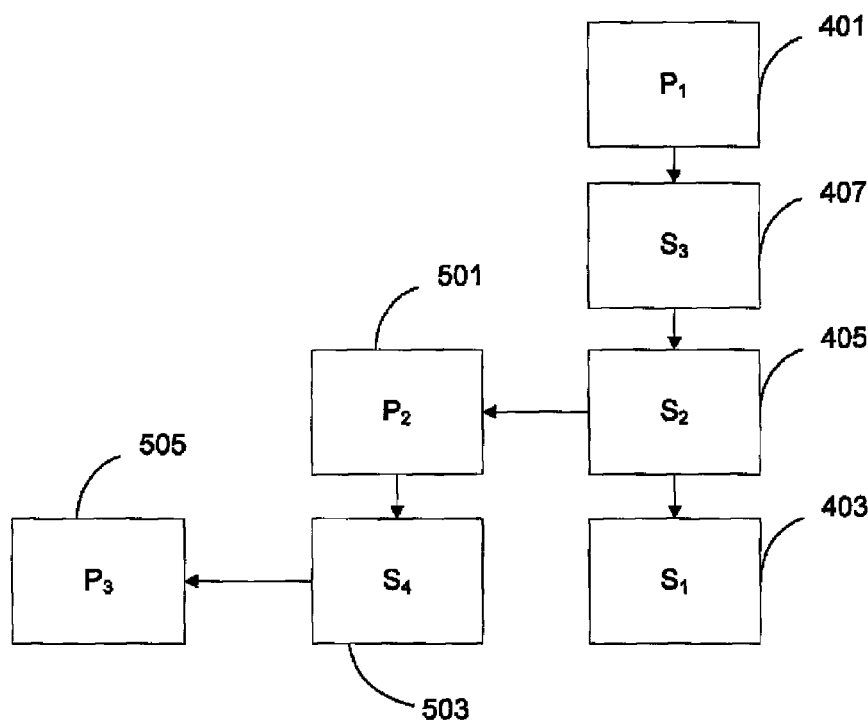
FIG. 5 is a block diagram of a production file and a set of snapshots having a non-linear version chain.
Figure 5B:
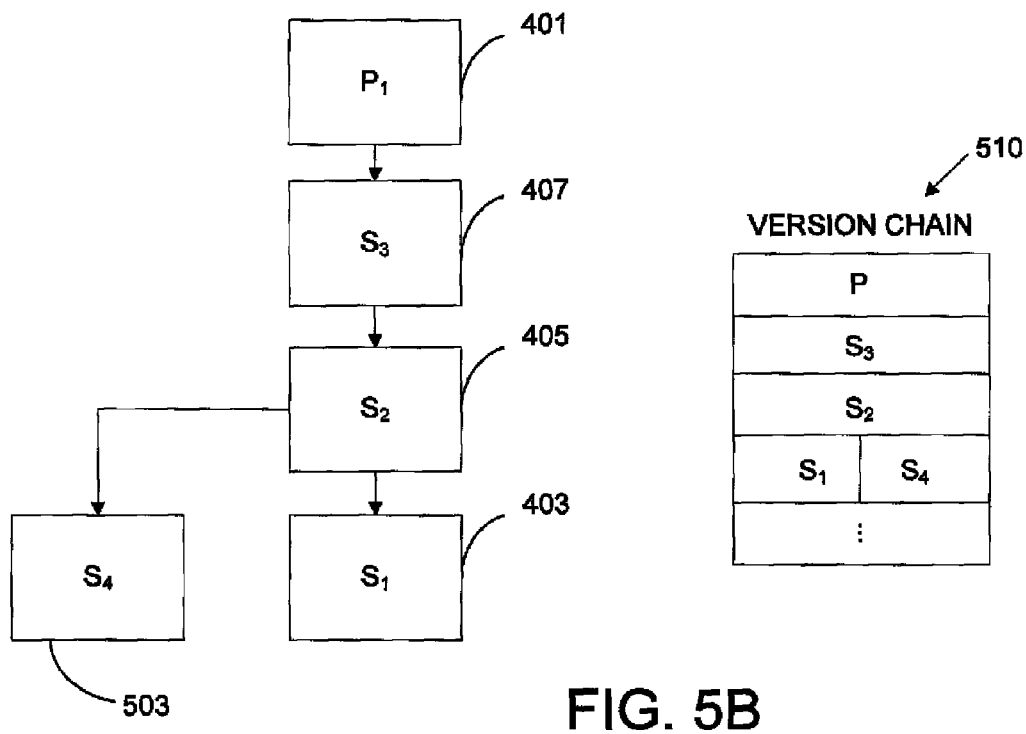

A simple example of a non-linear version chain that may be created using embodiments of the invention is illustrated in FIG. 5A. The non-linear version chain shown in FIG. 5A includes the same production file 401 and snapshots 403, 405, and 407 discussed in connection with FIG. 4. At some point in time, an application (or other entity) may issue a request to modify the contents of snapshot 405. In response to the request, a branch version 501 (which is a read/write copy of snapshot 405) may be created and made accessible to the application (e.g., by promotion) for reading and writing. The creation of a branch version 501 ensures that the contents of the snapshot 405 remain unchanged despite any modifications to the branch version 501. In the example of FIG. 5A, at some point in time during the promotion of the branch version 501, snapshot 503 is created from the branch version 501 and a second branch version 505 is created as a read/write copy of snapshot 503. The snapshot 503 reflects all of the modifications made to branch version 501 from the time the branch version 501 was promoted until the point in time at which the snapshot 503 was created. Continuing the example of FIG. 5A, after an application is finished using the branch version 501, the branch version 501 is demoted and the snapshot 503 is linked to its parent snapshot (i.e., snapshot 405) in the version chain as shown in FIG. 5B. To reflect the addition of new snapshot 503 to the version set, version chain data structure 510 may be updated such that that snapshot 405 points to both snapshot 403 (same as before creation of snapshot 503) and snapshot 503 created during the promotion of branch file 501. It should be appreciated that as the number of snapshots grows and additional snapshots of snapshots are created, using a version chain data structure (e.g., data structure 510) to keep track of all relationships between the snapshots in a version set becomes increasingly cumbersome.

In accordance with one embodiment, a descriptive naming convention is employed to facilitate the management of the relationships between snapshots in a version set mesh of the type described above. Using this technique, the names assigned to each snapshot in the version set may be used to identify the snapshots' position in the version set mesh. Thus, some embodiments of the present invention are directed to employing a hierarchical multi-level data structure for organizing snapshots in a version set as illustrated schematically in FIG. 6. Objects in the data structure (e.g., snapshots, directories) are named according to a descriptive naming convention to facilitate an identification of their position in the data structure. For example, snapshots created directly from the production file may be stored in a subdirectory named "D0", whereas snapshots of these snapshots (e.g., created during promotion or otherwise) may be stored in subdirectories named "D0.X" (e.g., "D0.1" and "D0.2" in the example of FIG. 6) located one level below the subdirectory named "D0," with snapshots created earlier in time being stored in a subdirectory with a lower number "X" (e.g., a snapshot in subdirectory D0.1 was created before a snapshot in subdirectory D0.2 in FIG. 6).

When a snapshot is created from any of the second level snapshots (e.g., from a snapshot located in subdirectories D0.1 or D0.2) in FIG. 6, the new snapshot may be stored in a subdirectory below that second level snapshot (e.g., a snapshot of a snapshot located in subdirectory D0.1 would be stored in subdirectory D0.1.X, e.g., subdirectory D0.1.1 in FIG. 6). While only three levels of snapshots are shown in FIG. 6, it should be appreciated that embodiments of the invention can represent version sets of far greater complexity and with any number of levels.

Figure 6:
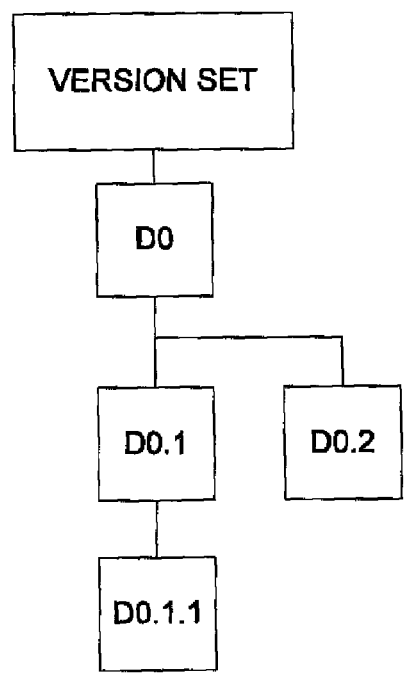
FIG. 6 is a block diagram of a generalized hierarchical directory structure for use with some embodiments of the invention.
Figure 7:
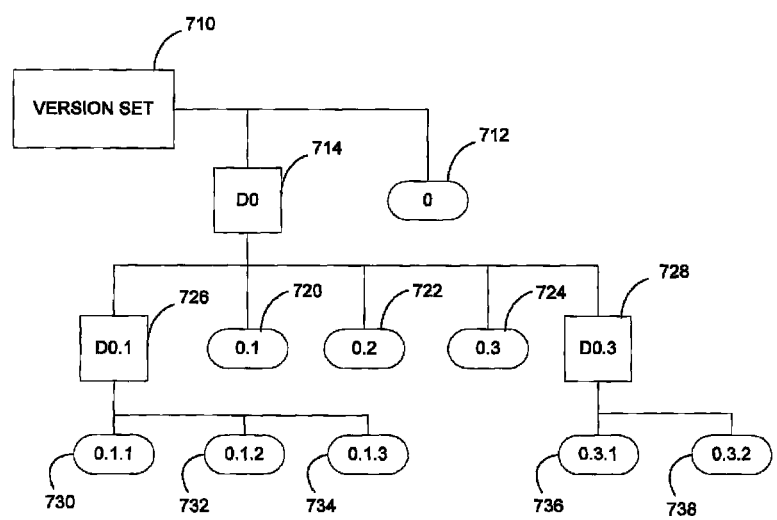
FIG. 7 is a block diagram of an on-disk representation of a exemplary directory structure in accordance with some embodiments of the invention.

A specific example of the hierarchical directory structure of FIG. 6 is illustrated in FIG. 7. In the illustrative example of FIG. 7, the version set 710 comprises the production file 712 (which is named "0") and two levels of snapshots created from the production file 712. At time $T_1$ a first snapshot 720 named "0.1" was created from production file 712 and was stored in the subdirectory 714 named "D0." At time $T_2$, a second snapshot 722 named "0.2" was created from production file 712 and was also stored in subdirectory 714 (i.e., subdirectory D0). At time $T_3$, a third snapshot 724 named "0.3" was created from production file 712 and was also stored in subdirectory 714 (i.e., subdirectory D0).

At some time after creating the snapshot 720, three additional snapshots 730, 732, and 734 (named "0.1.1," "0.1.2," and "0.1.3") were created from a branch file (i.e., a read/write copy of snapshot 720, and were stored in the subdirectory 726 (named "D0.1") located one level below subdirectory 714 (i.e., subdirectory D0) in the hierarchical directory structure. The snapshot 720 is disposed directly below subdirectory 714 because subdirectory 714 includes the snapshot 720 from which the new snapshots 730, 732, and 734 were created. Subdirectory 726 is named "D0.1" to reflect that all of the snapshots contained therein were created from the snapshot 720 named "0.1". After a user or application is finished using the branch file of snapshot 720, the snapshot 720 may be demoted, but the snapshots 730, 732, and 734 may be retained in the directory structure. As should be appreciated from the foregoing, the names of the snapshots 730, 732, and 734 (i.e., "0.1.1," "0.1.2," and "0.1.3") identify the position of each of these snapshots in the version set 710. That is, because the names of each of the snapshots "0.1.1," 0.1.2," and '0.1.3," begins with "0.1," it is evident, from the name alone, that each of these snapshots was created from the base snapshot named "0.1."

Continuing the example of FIG. 7, at some point in time following the creation of snapshot 724, two additional snapshots 736 and 738 were created, and each of these additional snapshots were stored in subdirectory 728 (named "D0.3") located one level below subdirectory 714 (i.e., subdirectory D0) in the hierarchical directory structure. The snapshots 736 and 738 are respectively named, "0.3.1" and "0.3.2" to identify that they are derived from the same parent snapshot 724 (named "0.3").

In some embodiments, some or all of the snapshots created during promotion of a branch version as discussed above, may be retained either automatically or in response to a user indication as aspects of the invention are not limited in this respect. For example, in one implementation, after a branch version is demoted, a user may be prompted to determine whether to save one or more of the snapshots created from the branch version during its promotion. The ability to retain one or more snapshots created from a branch version enables a more complete history of changes to a production file to be stored, and such snapshots of snapshots may be used, for example, to restore a production file to the point in time at which the snapshot of a snapshot was created.

The hierarchical directory structure of FIG. 7 for storing snapshots is merely one exemplary illustration, and it should be appreciated that such a directory structure may take any form and embodiments of the invention are not limited in this respect. For example, the number of levels in the hierarchical directory structure is not constant, as the disclosed directory structure can expand to support any number of levels or configurations of the version set 710. Additionally, any suitable naming convention may be used in connection with the hierarchical data structure of FIG. 7 (e.g., using letters, or a combination of numbers and letters, etc.) to represent the different levels of the hierarchy, as the aspects of the invention directed to a hierarchical naming structure are not limited to any particular naming convention. For example, the name of the production file may alternatively be "A" and the snapshots of production file A may be named A.1, A.2, etc. or A a, A.b, A.c, etc.

Figure 8:
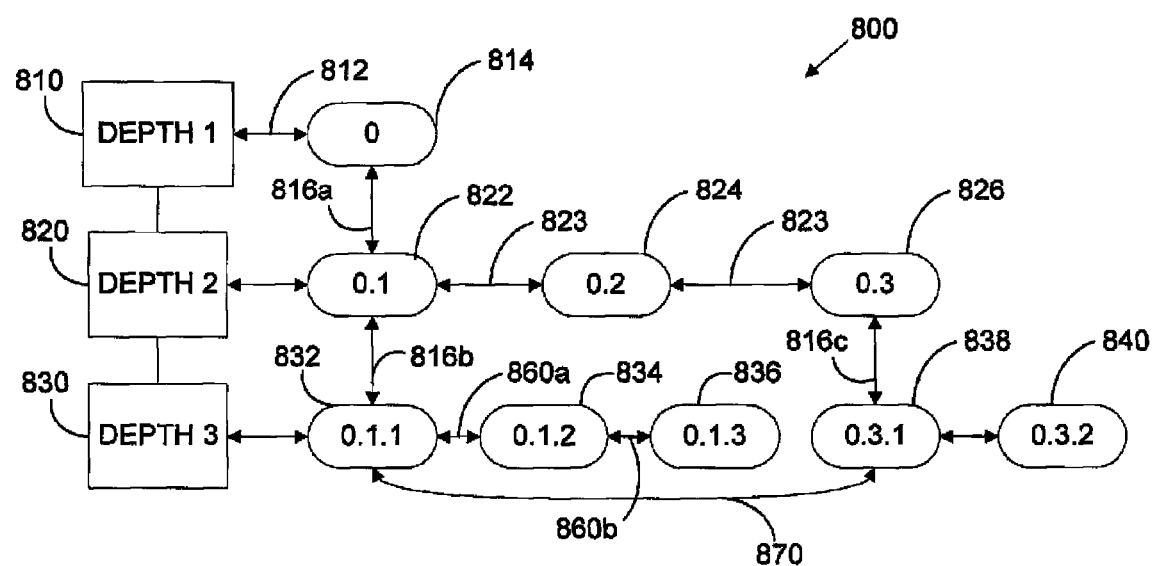
FIG. 8 is a block diagram of an in-memory representation associated with the on-disk representation of FIG. 7 in accordance with some embodiments of the invention.

In some embodiments, the directory structure shown in FIG. 7 may be retained in a non-volatile storage medium to ensure that the data is not lost. The non-volatile storage medium can take any form. In one example, the non-volatile memory may be a magnetic storage disk, a flash disk, or any other type of non-volatile storage media. Retrieving all or a portion of a version set directory structure from non-volatile storage (e.g., on disk) may be a relatively time-consuming process. Applicants have appreciated that retrieving the version set directory structure may be accelerated by storing the directory structure in memory. An in-memory data structure corresponding to the hierarchical directory structure of FIG. 7 is illustrated in FIG. 8. The in-memory data structure of FIG. 8 may allow for users or applications to access one or more snapshots without having to retrieve the snapshots from the disk.

For purposes of illustration, the in-memory data structure 800 of FIG. 8 comprises three depth levels corresponding to the three depth levels previously described for the directory structure of FIG. 7. A first depth level 810 (named "DEPTH 1") comprises a depth queue 812 which includes the production file 814. After one or more snapshots of the production file 814 are created, a second depth level 820 (e.g., corresponding to the subdirectory D0 in FIG. 7 and named "DEPTH 2") is created which comprises snapshots 822, 824, and 826 (correspondingly named "0.1," "0.2," and "0.3").

The snapshots in depth level 820 are linked to each other in a sibling queue in any suitable way (e.g., via sibling links 823). In one implementation, a sibling queue may be a single-linked list, similar to version chain 410 shown in FIG. 4B, but the aspects of the invention are not limited in this respect as the sibling queue can be implemented in any suitable way. For example, the sibling links may be alternatively represented as sibling link pointers in the metadata of each snapshot's mode. The links between snapshots in a sibling queue may be used by applications to determine the history of changes in the different versions of the production file 814.

Snapshots in different depth levels are associated via child links (e.g., 816a, 816b, 816c) to represent the relationship between a parent snapshot and the one or more child snapshots created from the parent snapshot. That is, child links enable an application to traverse the depth levels of the in-memory data structure shown in FIG. 8 to identify changes to a particular snapshot (e.g., by examining the contents of point-in-time copies of the snapshot). As illustrated in FIG. 8, in some embodiments, snapshots for which no child snapshots have been created (e.g., snapshot 824 named "0.2"), may not comprise any child links or, alternatively, the child link pointer for snapshots without child snapshots may be initialized to "NULL" until one or more child snapshots are created.

In one embodiment, the value of a child link pointer in the metadata of a snapshot is updated when the first child snapshot of a snapshot is created. For example, before any snapshots of a production file are created, a version set only comprises the production file 814 and the value of the child link pointer in the metadata of production file 814 is set to "NULL" (e.g., to reflect that there are no child snapshots). At some point in time, snapshot 822 is created from production file 814 and the value of the child link pointer in the metadata of the production file 814 is changed from "NULL" to point to snapshot 822 because the snapshot 822 is a child of the production file 814. As illustrated in FIG. 8, in one embodiment, a parent snapshot (e.g., production file 814) is associated via a child link only to the first snapshot created from it (i.e., the first snapshot in a sibling queue (e.g., snapshot 822)), whereas later created snapshots (e.g., snapshots 824 and 826) are linked indirectly to the parent snapshot via sibling links (e.g., sibling link 823) within a depth layer. As discussed above, the links between snapshots in a sibling queue enable an application to trace the change history to production file 814, for example, to locate a point in time before which a portion of the production file 814 was corrupted, and to be able to use the change history information to restore the production file 814 to that point in time.

A version set with two depth levels may be adequately captured with the single-linked list approach such as that described with respect to FIGS. 4A and 4B because the version chain is linear. However, as noted above, branching to create a non-linear version chain generates a version set mesh which becomes difficult to manage with a linear single-linked list data structure. An illustration of this complexity is shown in FIG. 8 with reference to a third depth layer 830 (named "DEPTH 3").

As described above, read/write copies (i.e., branch files) of read-only snapshots may be created so that an application may modify the contents of the snapshot without overwriting the read-only copy of the snapshot. The branch file of a snapshot may be promoted (i.e., made accessible to a user) and one or more additional read-only snapshots may be created at different points in time. In accordance with one embodiment, these additional "snapshots of snapshots" may be linked to the parent snapshot associated with the branch file via a child link as described above. For example, the snapshots 832, 834, and 836 created as point-in-time copies of snapshot 822 may be associated with snapshot 822 in a sibling queue in depth layer 830, with the first created of these (i.e., snapshot 832) being linked to the snapshot 822 via a child link. As with the snapshots in depth level 820, the sibling snapshots 832, 834, and 836 in depth level 830 are associated via sibling links 860 such as sibling link 860a which associates snapshot 832 and snapshot 834, and sibling link 860b which associates snapshot 834 and snapshot 836. As described above, one reason for creating sibling links 860 between snapshots in a sibling queue is to identify the change history of a particular snapshot that may be used to restore the production file 814 to a specific point in time.

In the example of FIG. 8, read-only snapshot 826 (named "0.3") was created by making a point-in-time copy of the production file 814. In accordance with one embodiment, a branch version (not shown) of the snapshot 826 was created and promoted (described in more detail above) to enable one or more applications to access (i.e., read from) and modify (i.e., write to) the contents of the branch version. Snapshots 838 and 840 of the branch version were created to keep track of changes made to the branch version by the one or more applications at two respective points in time during the promotion of the branch version. Following their creation, the snapshots 838 and 840 were associated with each other via sibling links in depth level 830 in a manner similar to that described above for snapshots 832, 834, and 836, and the first snapshot created during the promotion of the branch version for snapshot 826 (e.g., snapshot 838) was linked to the parent snapshot (i.e., snapshot 826) via a child link pointer in the metadata of the parent snapshot.

As should be appreciated from the foregoing, one or more applications granted access to snapshots in a version set (either read-only access or read/write access to branch files of snapshots) may use some or all of the associative links (e.g., child links, sibling links, etc.) between the snapshots to trace the history of changes to the contents of a particular version of a production file (e.g., snapshot 836 named "0.1.3" is related to the production file 814 via sibling links 860*a* and 860*b*, and child links 816*a* and 816*b*).

Applicants have also appreciated, however, that associating snapshots created within the same depth level, but which do not arise from the same parent snapshot (e.g., snapshots 832 and 838) may be useful to prevent the deletion of child snapshots when their parent snapshots are deleted, as would have been the case with some previous systems which employed a single linked list in which all child snapshots only depended directly from their parent snapshot. That is, although child snapshots created from different parent snapshots are not directly related (e.g., via child links and sibling links), they are nonetheless copies of the same production file 814, and a user may want to retain some or all of the child snapshots, even if one of their parent snapshots (e.g., snapshots 822 and 826) are selectively deleted from the hierarchical data structure 800. To associate these "distantly related" snapshots in a version set, some implementations utilize orphan links in the data structure 800. The use of orphan links enables the deletion of a parent snapshot (e.g., snapshot 826) without the loss of its respective child snapshots (e.g., snapshots 838 and 840). In accordance with some embodiments, orphan links are used to associate snapshots created from different parent snapshots but residing within the same depth level of the hierarchical data structure 800.

In the example of FIG. 8, depth level 830 comprises a first sibling queue with snapshots 832, 834, and 836, and a second sibling queue with snapshots 838 and 840. In accordance with some embodiments, the first snapshot in each of the sibling queues (i.e., the sibling queue header) in a depth level may be linked via orphan links, such as orphan link 870. Unlike sibling links and child links, which represent a direct lineage between snapshots in the hierarchical data structure 800, orphan links describe the depth level relationship between "distantly related" snapshots (e.g., snapshots 832 and 838) by effectively linking their sibling queues. As described above, orphan links may enable a user to retain one or more child snapshots despite deletion of the parent snapshot from which the child snapshots were created. For example, without orphan links, if snapshot 826 was selectively deleted, snapshots 838 and 840, which were created from snapshot 826 would cease to be connected to any other snapshot within the version set, with the consequence being that an application would be unable to access the snapshots 838 and 840 by traversing sibling links and child links from the production file 814 (i.e., snapshots 838 and 840 would not be accessible to an application accessing the version set). Applicants have appreciated that the creation of orphan links (e.g., orphan link 870), in accordance with some embodiments, is one solution to prevent this behavior. That is, in the example illustrated in FIG. 8, the orphan link 870 between snapshot 832 and 838 allows for the selective deletion of snapshot 826 without disassociating its child snapshots 838 and 840 from other snapshots in the data structure 800. Consequently, according to embodiments with orphan links, users are provided with an option to retain changes to a copy of production file (e.g., child snapshots) rather than automatically losing such changes when a parent snapshot is deleted. It should be appreciated that the creation of orphan links between sibling queue headers in a depth level is merely one solution to linking child snapshots to prevent their inaccessibility following deletion of their parent snapshot and other implementations of linking child snapshots (i.e., to other snapshots in the data structure 800) that would otherwise be lost upon such a deletion are possible, as aspects of the invention are not limited in this respect. For example, upon deletion of a parent snapshot, a link may be created between the parent snapshot's child snapshots and the preceding snapshot in the deleted parent's sibling queue (i.e., snapshot 838 may be linked to snapshot 824 upon deletion of snapshot 826).

As should be appreciated from the foregoing, multiple versions (e.g., snapshots) of a file in a file system may be stored in a data structure having a hierarchical organization that reflects relationships among the multiple versions. Each version may be assigned a descriptive name that identifies its position in the hierarchical organization. The adoption of an in-memory data structure (e.g., the data structure of FIG. 8), as compared to a data structure stored on disk (e.g., the data structure of FIG. 7), may enable applications to more quickly access one or more of the multiple versions of the file. The data structures described above, in accordance with some embodiments of the invention, may be implemented and used in any of numerous ways, examples of which are provided below. It should be appreciated however, that other implementations are possible, as embodiments of the invention are not limited in this respect.

Figure 9:
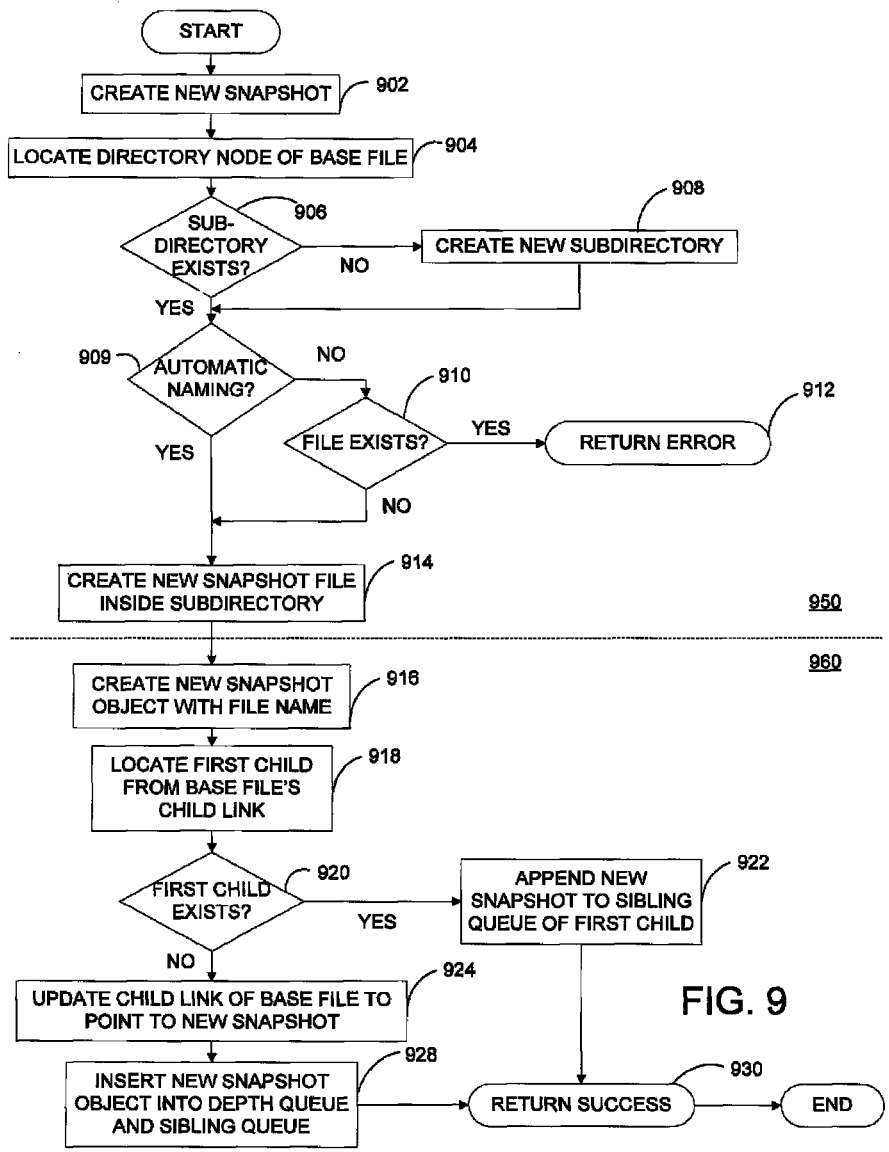
FIG. 9 is a flow chart showing an illustrative process for creating a new snapshot in a version set, in accordance with some embodiments of the invention.

One illustrative process for creating a snapshot in accordance with some embodiments of the invention is shown in FIG. 9. In act 902, a user, application, or any other entity requests the creation of a new snapshot. The request may include the file name for the file for which the snapshot is requested (also referred to as the base file name, e.g., "0" for the production file, "0.1" for the first snapshot of the production file, etc.) and the name of the new snapshot. In some embodiments, the name of the new snapshot may not be provided in the request and the new snapshot may be automatically assigned a name in accordance with an automatic naming procedure, discussed in more detail below. For example, referring to the example of FIGS. 7 and 8, the next number may be automatically assigned for the snapshot of the appropriate level (e.g., when a new snapshot of snapshot 720 is requested and snapshot 732 (named "0.1.2") already exists, the next name "0.1.3" can be automatically assigned to the new snapshot.).

In accordance with some embodiments, the process for creating a new snapshot includes updating both an on-disk representation of the version set and an in-memory data structure for the version set. As described above, the use of an in-memory data structure may facilitate a more rapid access of the data (e.g., snapshots) in the version set compared to retrieving the data from disk, whereas storing the snapshots of a version set on disk (or other non-volatile medium) ensures that the snapshots are retained despite possible interruptions in the operability of the computer system (e.g., a power failure) which may destroy the in-memory representation. Although acts 904-914 in FIG. 9 relate to updating an on-disk representation and acts 916-928 relate to updating an in-memory representation, it should be appreciated that the updating of the on-disk and in-memory representations may be performed in any order, as embodiments of the invention that update both are not limited in this respect. Additionally, in other embodiments, only one of an on-disk data structure and an in-memory data structure may be updated in response to creating a new snapshot. For example, in some embodiments, the in-memory data structure may be updated immediately so that version set being accessed by one or more applications is up-to-date. In such embodiments, the on-disk representation may be updated at a later time (e.g., when one or more snapshots in the version set are no longer being accessed by the one or more applications).

A first series of acts 950 relates to updating the on-disk representation of a version set (of the type shown in FIG. 7) in response to receiving a request to create a new snapshot. In act 904, the directory node for the base file (i.e., the source file such as the production file or a snapshot) is located in the hierarchical directory structure. The base file may be located in any suitable way. For example, in one implementation, a file system API may be used to search the file system for a file with a name that corresponds to the name of the base file provided in the request. In one example, the base file name provided in the request may be "0.1" and a file system API may be used to locate a directory node named "D0" corresponding to the subdirectory where the snapshot named "0.1" resides. In act 906, it is determined whether or not a subdirectory (e.g., subdirectory D0.1) exists at the located directory node for storing the new snapshot. If the subdirectory does not exist, then a new subdirectory is created in the directory node in act 908. Otherwise, if it is determined in act 906 that the subdirectory does exist, it may be further determined in act 909 if an automatic naming procedure is to be used.

As discussed above, some embodiments may employ an automatic naming procedure to allocate the name of the new snapshot (e.g., based on a base file name provided in the request), rather than requiring an application to specify the name of the new snapshot in the request. In embodiments that employ an automatic naming procedure, it is ensured that a new snapshot is not allocated the same name as a preexisting snapshot, and accordingly, it may be unnecessary to check to see if a snapshot with the allocated file name already exists, as discussed below.

In one example of an automatic naming procedure, in accordance with some embodiments of the invention, a request for creating a new snapshot may include a base file name (e.g., base file name "0.1"), and the process may examine the names of snapshots in a subdirectory associated with the base file name (e.g., a subdirectory named "D0.1") to allocate the name of the new snapshot (e.g., if snapshots named "0.1.1" and "0.1.2" already exist in the subdirectory "D0.1", the new snapshot may be assigned the name "0.1.3").

If it is determined in act 909 that an automatic naming procedure is to be used, a new snapshot file is created inside the subdirectory (e.g., subdirectory D0.1). In contrast, if it is determined in act 909 that an automatic naming procedure is not to be used, it is determined in act 910 if a file corresponding to the new snapshot already exists in the subdirectory. For example, if a request to create a new snapshot indicates that the name of the new snapshot should be "0.1.1," it should first be verified that a file with the provided name (i.e., a file named "0.1.1") does not exist. If it is determined in act 910 that the file does not exist, a new snapshot file with the name provided in the request is created inside the subdirectory (e.g., subdirectory D0.1) in act 914. Otherwise, if it is determined in act 910 that a snapshot with the requested name already exists in the subdirectory, an error may be returned in act 912 to the application (or other entity) that generated the request.

A second series of acts 960 relates to updating an in-memory representation of the version set (of the type shown in FIG. 8) in response to receiving a request to create a new snapshot. In act 916, the in-memory data structure is updated by creating a new snapshot object with the new snapshot name either specified in the request or automatically generated (e.g., "0.1.1"). To properly locate the new snapshot object within the in-memory data structure, the first child snapshot object from the base file object is identified in act 918. In some instances, the first child snapshot object may not exist (e.g., if the new snapshot object is the first child snapshot object). Thus, in some implementations, in act 920, it may be determined if a first child snapshot object exists by examining the contents of a child link pointer in the metadata of the base file object. If it is determined in act 920 that the first child snapshot object exists, then in act 922, the new snapshot object is appended to the sibling queue that comprises the first child snapshot object, and an indication is returned to the user or application that the creation of the new snapshot was successful. For example, if the request specifies that a new snapshot named "0.1.3" is to be created, it may be determined in act 920 that the first child snapshot object named "0.1.1" exists, and the new snapshot object "0.1.3" is appended to the sibling queue including snapshot "0.1.1." In contrast, if it is determined in act 920 that the new snapshot object is the first child snapshot object of a base file object (e.g., if the child link pointer in the metadata of the base file object is NULL), then the child link pointer of the base file object is updated in act 924 to point to the new snapshot object of the in-memory data structure.

After updating the child link pointer of the base file object in act 924, the new snapshot object is inserted into the appropriate depth queue and sibling queue in act 928 according to the conventions illustrated in FIG. 8. After inserting the new snapshot object into the in-memory data structure, a user, application, or other entity may be informed in act 930 that the creation of the new snapshot was successful.

As described above, the foregoing descriptive naming convention and data structures for managing a non-linear version set in accordance with some embodiments of the invention allows for deletion of a snapshot in the version set without also deleting the child snapshots of the deleted parent snapshot. In some embodiments, this may be accomplished through the use of orphan links which are established between child snapshots in the same depth level of the in-memory data structure as illustrated in FIG. 8. The orphan links may be created at any time, and embodiments of the invention are not limited in this respect. For example, an orphan link may be created any time that a new first child snapshot object (i.e., a sibling queue header) is added to a depth queue (provided that other sibling queues already exist in the depth queue). Alternatively, an orphan link for a child snapshot object may be created prior to the deletion of the parent snapshot object.

Figure 10:
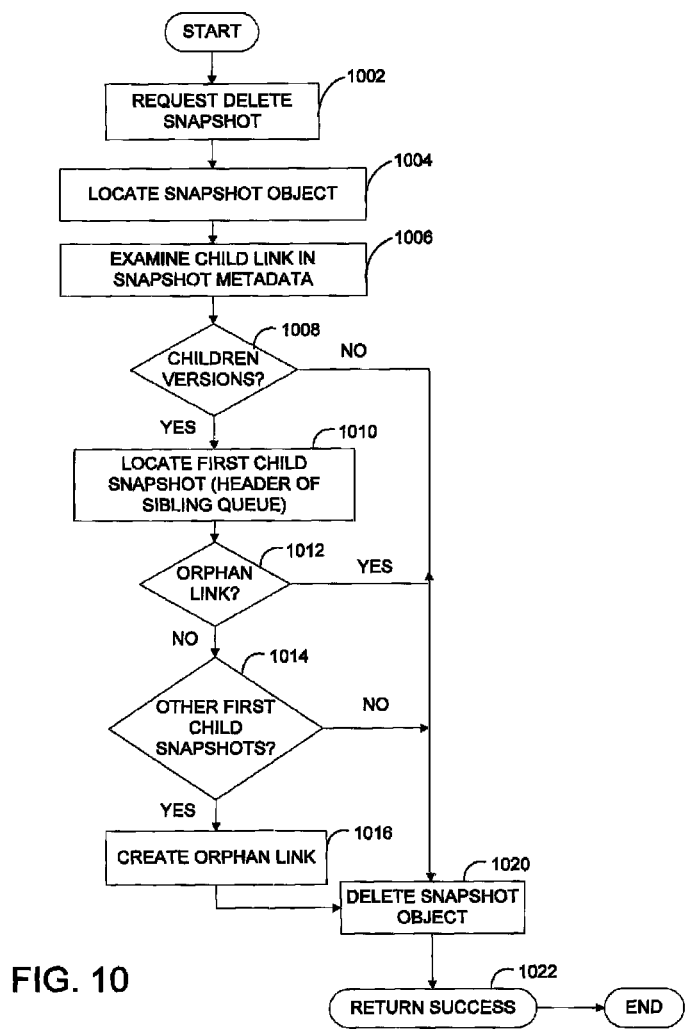
FIG. 10 is a flow chart showing an illustrative process for deleting a snapshot in a version set, in accordance with some embodiments of the invention.

An exemplary process for deleting a snapshot in accordance with some embodiments of the invention is shown in FIG. 10, however it should be appreciated that the process illustrated in FIG. 10 is merely one example of a process for deleting a snapshot and any other suitable process for deleting a snapshot may alternatively be used. In act 1002 a request is received to delete a snapshot. The request may identify (e.g., by providing at least the name of) the snapshot to be deleted and may be generated by a user, such as a file system administrator, an application, or in any other way, as embodiments of the invention are not limited in this respect. In response to receiving the request, the directory of the snapshot to be deleted and the snapshot object are located in act 1004.

It should be appreciated that the hierarchical data structure disclosed herein enables a rapid identification of a snapshot's on-disk and in-memory location due to the structured naming convention illustrated in FIGS. 6-8. For example, if the request specifies that the snapshot "0.3" is to be deleted, the name of the snapshot clearly indicates that this snapshot is the third snapshot of the production file and is located in the sibling queue of the second depth level of the in-memory data structure.

Prior to deleting a snapshot, some implementations may include a process for checking to see if the snapshot has any child snapshots, to ensure that the child snapshots are not lost when the parent snapshot is deleted. In some embodiments, checking for child snapshots may be accomplished by examining the metadata of the snapshot to be deleted in act 1006. For example, the metadata of the snapshot to be deleted may include a child link which points to a first child snapshot object. If it is determined in act 1008 that the snapshot to be deleted has no child snapshots, the blocks corresponding to the on-disk snapshot file are freed and the snapshot object is removed from the in-memory data structure. In contrast, if it is determined in act 1008 that the snapshot to be deleted has at least one child snapshot object (e.g., by determining that the value of the child link pointer is not NULL), the first child snapshot of the snapshot to be deleted (i.e., the parent file) may be located in act 1010 (e.g., by examining the value of the child link pointer in the parent file metadata).

In act 1012, the metadata of the first child snapshot may be examined to determine if an orphan link to any other first child snapshot objects in the same depth queue exist. If an orphan link already exists to another first child snapshot object, then it is safe to delete the parent snapshot in act 1020 because it can be assured that any child snapshot(s) of the parent snapshot will still be linked to other objects of the in-memory data structure following the deletion of the parent snapshot. As described above, linking child snapshot(s) of a deleted parent snapshot to other snapshots in the version set may allow for the child snapshots to be located in the version set by traversing an orphan link. By contrast, deletion of a parent snapshot in embodiments without orphan links (or some other technique to enable child snapshots to be retained) results in the loss of not only the parent snapshot, but all of the more recent snapshots derived from the parent snapshot as well (i.e., the child snapshots are lost). The use of orphan links according to some embodiments described herein provide a solution whereby the child snapshots of a deleted parent snapshot may still be located in the version set following deletion of the parent snapshot, but as discussed above, any other suitable technique could be employed.

If no orphan link is detected in act 1012, the depth queue of the first child snapshot may be examined in act 1014 to determine if any other first child snapshots exist. If it is determined in act 1014 that no other first child snapshots exist in the depth queue, an orphan link cannot be established, and the child snapshots will be lost when the parent snapshot is deleted (as described above for embodiments without orphan links). In such a case, the user may be notified prior to deleting the snapshot in act 1020 that the deletion of the parent snapshot will result in unlinked child snapshots, and the user may be given the option to abort the deletion of the parent snapshot.

If at least one additional first child snapshot object is detected in the depth queue in act 1014, an orphan link may be created in act 1016 so that the first child snapshot of the parent snapshot to be deleted points to the at least one additional first child snapshot in the depth queue. As described above, orphan links allow child snapshots of a deleted parent snapshot to still by accessed by an application following the deletion of the parent snapshot. Creation of an orphan link may be accomplished, for example, by updating the value of an orphan link pointer in the metadata of the first child snapshot of the parent snapshot to be deleted. Additionally, in some embodiments, the value of an orphan link pointer in the metadata of the at least one additional first child snapshot may also be updated to point to the first child snapshot of the parent snapshot to be deleted so that the orphan link is bidirectional (such as orphan link 870 in FIG. 8). Creating a bidirectional orphan link may be advantageous in implementations where the orphan link is created upon creation of a child snapshot rather than upon parent snapshot because in such implementations, the first child snapshot in a depth layer will not have an orphan link upon its creation (because there are no other child snapshots in the depth layer to link it to). Thus, creation of a bidirectional orphan link ensures that all sibling queues in a depth layer are linked to another sibling queue in the data structure.

The deletion of the parent snapshot may be performed in any suitable way as embodiments of the invention are not limited in this respect. For example, in one implementation, the deletion process may call a file system API to truncate the parent snapshot file until its size reaches zero. After the file size reaches zero, the file may be deleted and the parent snapshot object may be deleted from the in-memory representation of the version set. In some embodiments, the size of the snapshot file may be displayed to a user during the deletion process to illustrate how much of the file has been deleted. Following the deletion of the parent snapshot in act 1020, the user may be provided with a notification that the snapshot was successfully deleted.

The foregoing description of a deletion process included acts for determining if a parent snapshot was linked to any child snapshots and for creating one or more orphan links if at least one child snapshot was found not to contain such a link. The creation of orphan links enabled the child snapshot versions to remain accessible to an application despite the deletion of their parent snapshot. It should be appreciated that in some embodiments, snapshots may be deleted without checking for child snapshots and/or creating a data structure (e.g., orphan links or some other suitable data structure) to enable child snapshots remain accessible to an application following deletion of a parent snapshot, as embodiments of the invention are not limited in this respect. For example, in some embodiments, orphan links (or some other suitable data structure) may be created each time that a first child snapshot in a sibling queue is created, thereby ensuring the retention of the snapshots in the sibling queue despite the deletion of the corresponding parent snapshot (i.e., the parent of the first child snapshot).

Figure 11:
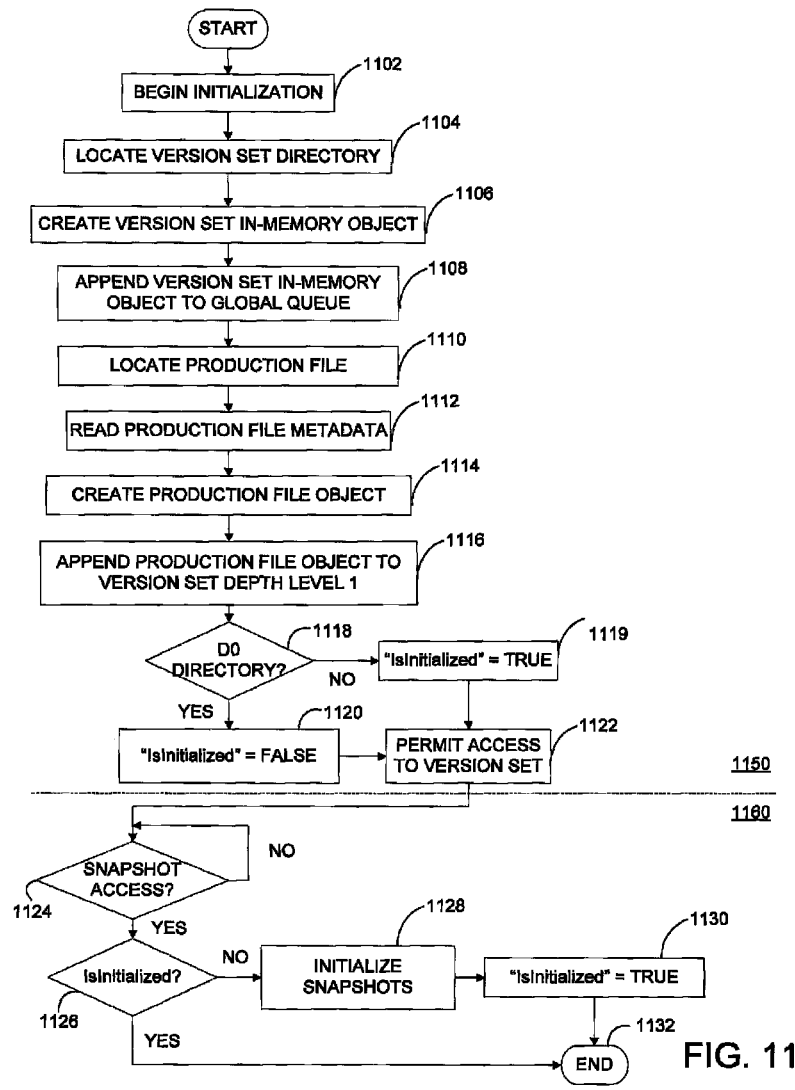
FIG. 11 is a flow chart showing an illustrative process for on-demand initialization of a version set, in accordance with some embodiments of the invention.

Applicants have recognized and appreciated that employing a hierarchical version set management schema in accordance with some embodiments of the invention discussed above may reduce the amount of time needed to initialize the version set for access. In some prior art systems, each file in a version set directory needs to be scanned during system boot-up because of the dependency between the snapshots in the version set (e.g., as illustrated in FIG. 4A). Applicants have appreciated that this exhaustive approach to version set initialization becomes reasonably time consuming as the version set mesh becomes large. Thus, some embodiments are directed to an on-demand or staged initialization process whereby only a portion of the version set is scanned during system boot-up to create the production file (i.e., the writable copy), and the snapshots are initialized at a later point in time. FIG. 11 shows an illustrative process for staged initialization of a version set according to some embodiments of the invention.

In some embodiments, the initialization process may proceed in two phases. In a first phase 1150, the production level directory is initialized so that the production file is made accessible to users or applications of the computer system on which the version set resides. Then, in a second phase 1160, at least some of the remaining portion of the version set (e.g., snapshots) is initialized in response to a request to access a snapshot.

With respect to the first phase 1150, in act 1102, a computer system (e.g., a data mover described in more detail below) is powered on and a version set initialization process begins. In act 1104, a file system API or another one or more initialization functions attempts to identify the location of the version set directory on disk. If the version set directory is not found, the initialization API may return an error (not shown). However, if the version set directory is found, an in-memory object for the version set is created in act 1106 by allocating memory in which to store the version set data structure. In accordance with some embodiments, the in-memory data structures of version sets for all files in a file system may be associated in memory using a global in-memory queue. In such embodiments, after creation of the new version set object in act 1106, the new version set object may be appended to the global in-memory queue in act 1108 so that the version set being initialized is associated with version sets for other files in the file system. One reason for creating a global in-memory queue to associate version set data structures may be to facilitate determining a "view of the file system" at a particular point in time, although it should be appreciated that other uses of the global in-memory queue are also possible.

After creating the version set object, the process of initializing the production level directory commences. In act 1110, a production file is located using any suitable technique (e.g., a file system API). Once the production file has been located, metadata associated with the production file is read in act 1112. It should be appreciated that the metadata may be stored in the production file itself, and/or the metadata may be stored in a separate file in the production level directory. The metadata may include information about the production file (i.e., file attributes) such as, for example, the file name, version number, etc. In act 1114, a production file in-memory object is created using at least some of the attribute information in the production file metadata (e.g., file name). After creating the production file object, the object is positioned within the first level of the in-memory data structure comprising the version set object created in act 1106 (e.g. by associating the production file object with the first entry in a depth queue). In some implementations, a depth queue may be an in-memory data structure such as an array which links together sibling queues at multiple depth levels. For example, the sibling queue of snapshots 832, 834, and 836 (named "0.1.1-0.1.2-0.1.3" in FIG. 8) and the sibling queue of snapshots 838 and 840 (named "0.2.1-0.2.2-0.2.3" in FIG. 8) may both have a depth level of three. In the foregoing example, the depth queue may be an array called "depthArray" in which second element of depthArray points to the snapshot 0.1.1 and the orphan link 870 of snapshot "0.1.1" points to the snapshot "0.3.1".

In some embodiments, a version set may comprise an attribute which indicates whether or not the version set has been fully initialized. In one implementation, this attribute is a Boolean attribute called "IsInitialized." In act 1118, the contents of the production file directory are scanned to determine if a snapshot directory (e.g., directory "D0") exists. The existence of a snapshot directory indicates that at least a portion of the version set will remain uninitialized until a request is received to access a snapshot. If it is determined in act 1118 that a snapshot directory exists, the IsIntialized attribute is set to FALSE in act 1120, and the version set (at least the production file) is made accessible to users and applications in act 1122 for reading and writing. However, if it is determined in act 1118 that a snapshot directory does not exist in the production file directory, the IsInitialized attribute is set to TRUE in act 1119 thereby indicating the version set is fully initialized.

In accordance with some embodiments, a second phase of initialization 1160 may be triggered in response to receiving a request to access a snapshot. In act 1124, it is determined if a request to access a snapshot (e.g., to promote a branch version of the snapshot) as been received. If a request to access a snapshot has been received in act 1124, the value of the IsInitialized attribute for the version set including the snapshot is evaluated in act 1126. If the version set only comprises the production file object, or if at least one of the snapshots in the version set has been previously accessed, the value of IsInitialized may be determined to be TRUE in act 1126, indicating that the version set is already fully initialized, and the initialization process ends in act 1132. In contrast, if it is determined in act 1126 that IsInitialized is set to FALSE, then all of the snapshots of the version set are initialized in act 1128 prior to permitting access by the user or application which generated the access request. After all of the snapshots have been initialized, the IsInitialized attribute is set to TRUE in act 1130 to indicate that the version set is now fully initialized and access to the snapshots is granted to the one or more users or applications of the computer system.

The snapshots of the production file may be initialized in any suitable manner. For example, a file system API for creating a snapshot object may be called for each snapshot in the version set. The file system API may additionally insert each newly created snapshot object into the in-memory data structure by providing appropriate values for attributes in the object's associated metadata including information related to the sibling queue, child link pointer, depth queue, etc. of the snapshot object.

Figure 12:
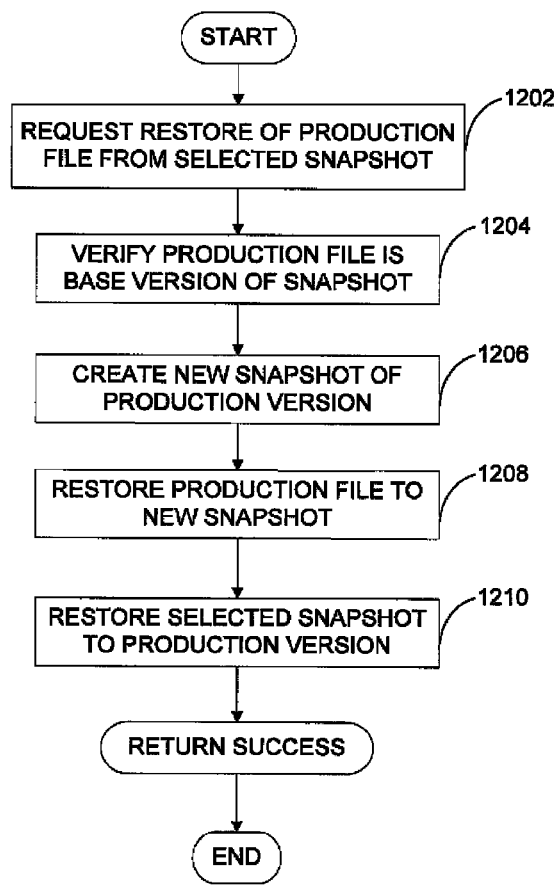
FIG. 12 is a flow chart of an illustrative process for restoring a production file to a previously-created snapshot in a version set, in accordance with some embodiments of the invention.

In accordance with some aspects of the invention, a non-destructive restore of a production file can be performed using a previously-created snapshot. In prior art systems that employ a linear version chain in which later created snapshots in the version chain are necessarily dependant on earlier created snapshots, a restore from a snapshot necessarily destroys the snapshot and any earlier created snapshots that are dependant upon it. By contrast, the hierarchical version set directory structure, in accordance with some embodiments of the invention, imposes no such dependency between snapshots in a depth level. As a result, according to some embodiments of the invention, any snapshot in the version set may be selected for restoring its contents to the production file without destroying snapshots that were created after the selected snapshot. An illustrative process for using a snapshot in a version set to restore a production file according to some embodiments of the invention is shown in FIG. 12.

In act 1202, a request to restore the production file using a previously-created snapshot is received from a user or application. In one implementation, a restore request may include restore information such as the name of the snapshot to be used as the source file and the name of the production file to be used as the target file in the restore process. The restore request may additionally comprise other information, as embodiments of the invention are not limited in this respect. In response to the request, a file system API may optionally verify in act 1204 that the production file is a base version of the snapshot. This verification ensures that the snapshot selected for restore was created at one point in time from the specified production file or one of its child snapshots (i.e., the snapshot was not created from a different production file).

Following verification, a new snapshot of the production file is created in act 1206, for example, according to the process illustrated in FIG. 9. After the new snapshot is created, the contents of the production file are optionally copied to the newly created snapshot so that the contents of the production file are not lost during the restore process. One purpose for copying the contents of the production file to the newly created snapshot is to ensure that the production file may be recovered back to the point in time before the restore began, if something goes wrong during the restore. In one implementation, only the metadata of the production file (e.g., from the production file's mode) is copied to the newly created snapshot. This approach is possible because in a write-anywhere system the original data will not be overwritten (i.e., a copy of modified blocks will be made prior to them being overwritten). By copying only the metadata (i.e., instead of all of the corresponding data blocks as well) the restore process may be completed more quickly.

In act 1212, the contents of the selected snapshot are restored to the production file, by, for example, copying the metadata from the selected snapshot's mode to the metadata of the production file's mode. Thus, after the restore, the contents of the production file are identical to the contents of the production file at the point in time at which the selected snapshot was created. Additionally, unlike some prior art systems, all snapshots in the version set created after the selected snapshot are preserved because the hierarchical version set data structure, in accordance with some embodiments of the invention, does not impose a dependency between snapshots in a depth level (unlike the linear version chain data structures used in some prior art systems).

The above-described techniques may be implemented in any suitable file system and on any suitable computer system, as the invention is not limited in this respect. One example of a computer system in which some embodiments may be implemented is a network file server. An example of such a file server in a computer network is shown in FIG. 13.

Figure 13:
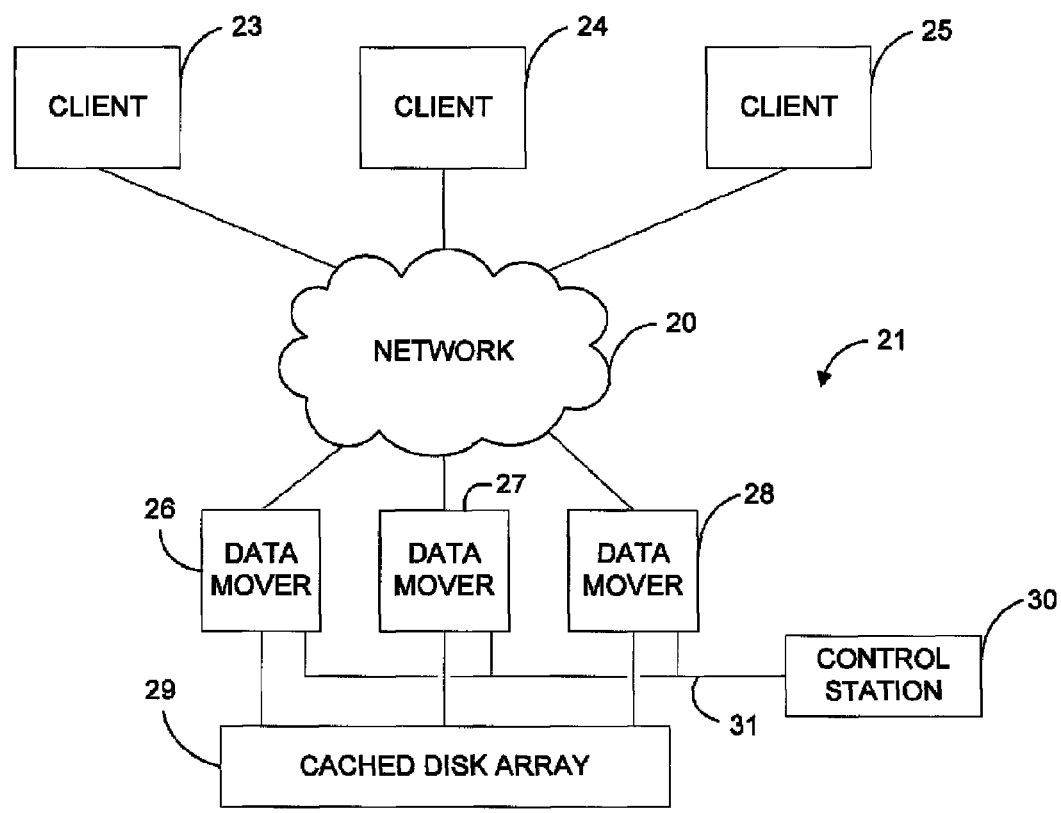
FIG. 13 is a block diagram of a computer network including a network file server upon which embodiments of the invention may be implemented.

FIG. 13 shows an Internet Protocol (IP) network 20 including a network file server 21 and multiple clients 23, 24, 25. The network file server 21 may have, for example, multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29. The clustering of the data movers 26, 27, 28 as a front end to the cached disk array 29 provides parallelism and scalability.

The data movers may be implemented in any suitable way, as the invention is not limited in this respect. For example, each of the data movers 26, 27, and 28 may be a commodity computer, that includes at least one memory for storing executable code to perform the techniques described above and at least one processor to execute this code.

The data mover computers 26, 27, and 28 may communicate with the other network devices in any suitable way, as the invention is not limited in this respect. For example, the data movers may communicate using standard file access protocols such as the Network File System (NFS) or the Common Internet File System (CIFS) protocols, but the data mover computers need not necessarily employ standard operating systems. For example, in some embodiments, the network file server 21 may be programmed with a Unix-based file system that has been adapted for rapid file access and streaming of data between the cached disk array 29 and the data network 20 by any one of the data mover computers 26, 27, 28.

Figure 14:
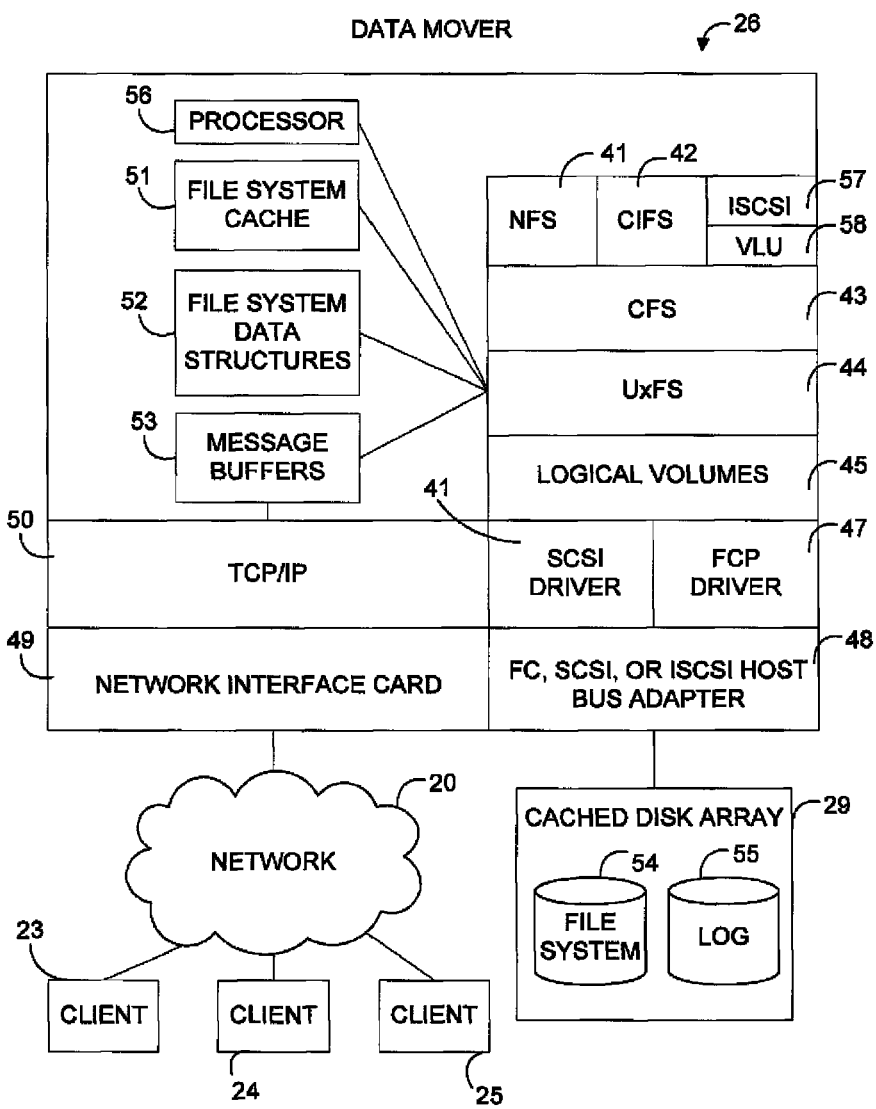
FIG. 14 is a block diagram of an illustrative data mover of the network file server of FIG. 13.

FIG. 14 is a block diagram of an example of a data mover. As shown in FIG. 14, data mover 26 has a Network File System (NFS) module 41 for supporting communication among the clients and other data movers over the IP network 20 using the NFS file access protocol, a Common Internet File System (CIFS) module 42 for supporting communication over the IP network using the CIFS file access protocol, and an Internet Small Computer System Interface (ISCSI) module 57 for supporting communication over the IP network using the ISCSI protocol. Communication with the ISCSI module 57 is supported by a Virtual LUN (VLU) module 58, which is created as a file object within a file system. The NFS module 41, the CIFS module 42, and the ISCSI/VLU modules 57,58 are layered over a Common File System (CFS) module 43, and the CFS module is layered over a Universal File System (UxFS) module 44. The UxFS module supports a UNIX-based file system, and the CFS module 43 provides higher-level functions common to NFS and CIFS.

The UxFS module accesses data organized into logical volumes defined by a module 45. Each logical volume maps to contiguous logical storage addresses in the cached disk array 29. The module 45 is layered over a SCSI driver 46 and a Fibre-channel protocol (FCP) driver 47. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients 23, 24,25. A processor 56 may be programmed to control reading to and writing from files in the file system 54. For example, the processor 56 may be configured to execute a series of computer-readable instructions stored on a computer readable storage medium as described below.

To maintain the file system 54 in a consistent state during concurrent writes to a file, the UxFS layer maintains file system data structures 52 in random access memory of the data mover 26. To enable recovery of the file system 54 to a consistent state after a system crash, the UxFS layer writes file metadata to a log 55 in the cached disk array during the commit of certain write operations to the file system 54.

Aspects of the invention, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of organizing a plurality of versions of a file, wherein the plurality of versions of the file comprise a production version, at least two snapshot versions, and one or more branch versions, wherein each snapshot version is a read-only copy of the production version or of one of the one or more branch versions, and wherein each branch version is a modifiable copy of one of the at least two snapshot versions, the method comprising:
    storing the plurality of versions of the file in a data structure having a hierarchical organization that reflects relationships among the plurality of versions, and wherein each version of the plurality of versions is assigned a name that identifies its position in the hierarchical organization, wherein the plurality of versions of the file are represented as a plurality of objects, each of the plurality of objects being representative of one of the plurality of versions of the file, wherein the hierarchical organization is established through a plurality of links, each link being between two of the plurality of objects, wherein the at least two snapshot versions include a parent version and a child version that is derived from the parent version, and wherein the plurality of links establishes at least one software-traversable path from the child version to the production version that does not include the parent version, wherein the at least one software-traversable path is established while both the child version and the parent version exist and prior to receiving a request to delete the parent version; and
    after the at least one software-traversable path from the child version to the production version is established, deleting the parent version from the data structure.

2. The method of claim 1, wherein storing the plurality of versions of the file further includes assigning a name to the child version that identifies it as having been derived from the parent version.

3. The method of claim 1, further comprising:
    initializing a first portion of the data structure to enable at least one application to access the first portion, wherein the first portion of the data structure is less than the totality of the data structure.

4. The method of claim 3, further comprising:
    in response to receiving a request to access a first version of the plurality of versions of the file, initializing a second portion of the data structure to enable the at least one application to access the second portion of the data structure, wherein the second portion includes at least the first version.

5. The method of claim 1, wherein the plurality of versions of the file are represented as a plurality of storage objects.

6. The method of claim 1, further comprising:
    retaining the child version following the deletion of the parent version.

7. At least one non-transitory computer-readable medium encoded with a series of instructions that, when executed by a computer, perform a method of organizing a plurality of versions of a file, wherein the plurality of versions of the file comprise a production version, at least two snapshot versions, and one or more branch versions, wherein each snapshot version is a read-only copy of the production version or of one of the one or more branch versions, and wherein each branch version is a modifiable copy of one of the at least two snapshot versions, the method comprising:
    storing the plurality of versions of the file in a data structure having a hierarchical organization that reflects relationships among the plurality of versions, and wherein each version of the plurality of versions is assigned a name that identifies its position in the hierarchical organization, wherein the plurality of versions of the file are represented as a plurality of objects, each of the plurality of objects being representative of one of the plurality of versions of the file, wherein the hierarchical organization is established through a plurality of links, each link being between two of the plurality of objects, wherein the at least two snapshot versions include a parent version and a child version that is derived from the parent version, and wherein the plurality of links establishes at least one software-traversable path from the child version to the production version that does not include the parent version, wherein the at least one software-traversable path is established while both the child version and the parent version exist and prior to receiving a request to delete the parent version; and
    after the at least one software-traversable path from the child version to the production version is established, deleting the parent version from the data structure.

8. The at least one non-transitory computer readable medium of claim 7, wherein storing the plurality of version of the file further includes assigning a name to the child version that identifies it as having been derived from the parent version.

9. The at least one non-transitory computer readable medium of claim 7, wherein the method further comprises:
    initializing a first portion of the data structure to enable at least one application to access the first portion, wherein the first portion of the data structure is less than the totality of the data structure.

10. The at least one non-transitory computer readable medium of claim 9, wherein the method further comprises:
    in response to receiving a request to access a first version of the plurality of versions of the file, initializing a second portion of the data structure to enable the at least one application to access the second portion of the data structure, wherein the second portion includes at least the first version.

11. The at least one non-transitory computer readable medium of claim 7, wherein the plurality of versions of the file are represented as a plurality of storage objects.

12. The at least one non-transitory computer readable medium of claim 7, wherein the method further comprises:
retaining the child version following the deletion of the parent version.

13. The at least one non-transitory computer readable medium of claim 7, wherein the plurality of versions of the file comprises a first version and at least one second version that is linked to the production version through a path that includes the first version, and wherein the method further comprises:
performing a restore operation to replace the production version with the first version; and
retaining the at least one second version in the data structure following the restore operation.

14. A computer system for organizing a plurality of versions of a file, wherein the plurality of versions of the file comprise a production version, at least two snapshot versions, and one or more branch versions, wherein each snapshot version is a read-only copy of the production version or of one of the one or more branch versions, and wherein each branch version is a modifiable copy of one of the at least two snapshot versions, the computer system comprising:
at least one storage medium for storing the plurality of versions of the file; and
at least one processor programmed to:
store, on the at least one storage medium, the plurality of versions of the file in a data structure having a hierarchical organization that reflects relationships among the plurality of versions, and wherein each version of the plurality of versions is assigned a name that identifies its position in the hierarchical organization, wherein the plurality of versions of the file are represented as a plurality of objects, each of the plurality of objects being representative of one of the plurality of versions of the file, wherein the hierarchical organization is established through a plurality of links, each link being between two of the plurality of objects, wherein the at least two snapshot versions include a parent version and a child version that is derived from the parent version, and wherein the plurality of links establishes at least one software-traversable path from the child version to the production version that does not include the parent version, wherein the at least one software-traversable path is established while both the child version and the parent version exist and prior to receiving a request to delete the parent version; and
after the at least one software-traversable path from the child version to the production version is established, delete the parent version from the data structure.

15. The computer system of claim 14, wherein the storing the plurality of versions comprises assigning a name to the child version that identifies it as having been derived from the parent version.

16. The computer system of claim 14, wherein the at least one processor is further programmed to:
initialize a first portion of the data structure to enable at least one application to access the first portion, wherein the first portion of the data structure is less than the totality of the data structure.

17. The computer system of claim 14, wherein the plurality of versions of the file are represented as a plurality of storage objects.

18. The computer system of claim 14, wherein the at least one processor is further programmed to implement the data structure as a hierarchical directory structure that comprises a directory that stores the production version and a plurality of subdirectories for storing the one or more snapshot versions and the one or more branch versions, wherein each subdirectory is included within a corresponding higher level subdirectory or directory and stores at least one version that is derived from a version stored in the corresponding higher level subdirectory or directory.

19. The computer system of claim 14, wherein the plurality of versions of the file comprises a first version and at least one second version that is linked to the production version through a path that includes the first version, and wherein the at least one processor is further programmed to:
perform a restore operation to replace the production version with the first version; and
retain the at least one second version in the data structure following the restore operation.

* * * * *